US008727636B2

(12) United States Patent  
    Isenhour et al.

(10) Patent No.: US 8,727,636 B2
(45) Date of Patent: May 20, 2014

(54) FIBER OPTIC INTERFACE DEVICE WITH POSITIONABLE CLEANING COVER

(75) Inventors: Micah C. Isenhour, Lincolnton, NC (US); Dennis M. Knecht, Hickory, NC (US); James P. Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 422 days.

(21) Appl. No.: 13/050,629

(22) Filed: Mar. 17, 2011

(65) Prior Publication Data

US 2011/0229088 A1    Sep. 22, 2011

Related U.S. Application Data

(60) Provisional application No. 61/315,419, filed on Mar. 19, 2010, provisional application No. 61/315,427, filed on Mar. 19, 2010.

(51) Int. Cl.
    *G02B 7/00* (2006.01)
(52) U.S. Cl.
    USPC ................................... 385/78; 385/70
(58) Field of Classification Search
    USPC ........................................ 385/78, 70
    See application file for complete search history.

(56) References Cited

U.S. PATENT DOCUMENTS

| 4,557,554 A | 12/1985 | Blanc | 350/96.2 |
| 4,708,432 A | 11/1987 | Berg | 350/96.21 |
| 4,726,646 A | 2/1988 | Tanaka et al. | 350/96.2 |
| 4,730,885 A | 3/1988 | Doi | 350/96.15 |
| 4,738,506 A | 4/1988 | Abendschein et al. | 385/96.2 |
| 4,755,415 A | 7/1988 | Iijima et al. | 428/163 |
| 4,863,267 A * | 9/1989 | Bendickson et al. | 356/155 |
| 5,020,949 A | 6/1991 | Davidson et al. | 411/7 |
| 5,202,943 A | 4/1993 | Carden et al. | 385/92 |
| 5,202,949 A | 4/1993 | Hileman et al. | 385/134 |
| 5,317,485 A | 5/1994 | Merjanian | 362/32 |
| 5,329,604 A | 7/1994 | Baldwin et al. | 385/92 |
| 5,452,388 A | 9/1995 | Rittle et al. | 385/92 |
| 5,506,922 A | 4/1996 | Grois et al. | 385/75 |
| 5,687,268 A | 11/1997 | Stephenson et al. | 385/73 |

(Continued)

FOREIGN PATENT DOCUMENTS

EP    0838702 B1    10/2006
EP    1925958 A1    5/2008

(Continued)

OTHER PUBLICATIONS

PCT International Search Report, Application No. PCT/US2011/028775, May 24, 2011, 2 pages.

(Continued)

*Primary Examiner* — Kaveh Kianni

(57) ABSTRACT

A fiber optic interface device (10) with a positionable cover (100) is disclosed. The device includes a ferrule (50) supported by a housing (21). The ferrule has a front section (65) with a surface (66) and is configured to support at least one optical path interface (OPI) at the front-section surface. The cover supports a cleaning member (170) and is positionable in open and closed positions. In the closed position, the cleaning member is proximate to the at least one optical path interface, and in the open position the at least one optical path interface is exposed.

10 Claims, 14 Drawing Sheets

(56) References Cited

U.S. PATENT DOCUMENTS

| | | | |
|---|---|---|---|
| 5,940,560 A | 8/1999 | De Marchi et al. | 385/58 |
| 5,956,793 A * | 9/1999 | Cox | 15/104.002 |
| 6,079,881 A | 6/2000 | Roth | 385/76 |
| 6,081,647 A | 6/2000 | Roth et al. | 385/139 |
| 6,108,482 A | 8/2000 | Roth | 385/139 |
| 6,179,479 B1 | 1/2001 | Crivelli | 385/73 |
| 6,188,825 B1 | 2/2001 | Bandy et al. | 385/134 |
| 6,206,577 B1 | 3/2001 | Hall, III et al. | 385/53 |
| 6,264,374 B1 | 7/2001 | Selfridge et al. | 385/78 |
| 6,340,246 B1 | 1/2002 | Yoshida et al. | 385/73 |
| 6,352,375 B1 | 3/2002 | Shimoji et al. | 385/92 |
| 6,398,422 B1 * | 6/2002 | Szilagyi et al. | 385/76 |
| 6,425,694 B1 | 7/2002 | Szilagyi et al. | 385/76 |
| 6,461,054 B1 | 10/2002 | Iwase | 385/73 |
| 6,471,412 B1 | 10/2002 | Belenkiy et al. | 385/53 |
| 6,511,229 B2 | 1/2003 | Kiani | 385/53 |
| 6,572,274 B1 | 6/2003 | Margaliot et al. | 385/75 |
| 6,595,696 B1 | 7/2003 | Zellak | 385/72 |
| 6,652,152 B2 | 11/2003 | Yang et al. | 385/53 |
| 6,688,780 B2 | 2/2004 | Duran | 385/76 |
| 6,715,930 B2 | 4/2004 | McBride | 385/73 |
| 6,764,222 B1 | 7/2004 | Szilagyi et al. | 385/55 |
| 6,775,459 B2 | 8/2004 | Hong et al. | 385/140 |
| 6,793,399 B1 | 9/2004 | Nguyen | 385/53 |
| 6,793,402 B2 | 9/2004 | Uchida | 385/76 |
| 6,796,719 B2 | 9/2004 | Zhu et al. | 385/76 |
| 6,811,318 B1 * | 11/2004 | Hollis et al. | 385/53 |
| 6,845,210 B2 | 1/2005 | Ohbayashi et al. | 385/139 |
| 6,866,424 B2 | 3/2005 | Tanaka et al. | 385/55 |
| 6,945,705 B2 | 9/2005 | Takeda et al. | 385/77 |
| 6,965,720 B2 | 11/2005 | Melnyk et al. | 385/134 |
| 6,984,075 B2 | 1/2006 | Satoh | 385/92 |
| 6,988,836 B2 | 1/2006 | Wang | 385/92 |
| 7,025,609 B2 | 4/2006 | Matsumoto et al. | 439/138 |
| 7,086,878 B2 | 8/2006 | Mine et al. | 439/137 |
| 7,114,856 B2 | 10/2006 | Ohbayashi et al. | 385/88 |
| 7,144,163 B2 | 12/2006 | Tanaka et al. | 385/75 |
| 7,150,567 B1 | 12/2006 | Luther et al. | 385/78 |
| 7,153,041 B2 | 12/2006 | Mine et al. | 385/92 |
| 7,237,965 B2 | 7/2007 | Brownjohn | 385/71 |
| 7,261,471 B2 | 8/2007 | Tsuchida et al. | 385/70 |
| 7,331,718 B2 | 2/2008 | Yazaki et al. | 385/78 |
| 7,419,310 B2 | 9/2008 | Mizuno | 385/88 |
| 7,559,700 B2 | 7/2009 | Eguchi et al. | 385/70 |
| 7,572,066 B2 | 8/2009 | de Jong et al. | 385/88 |
| 7,785,018 B2 | 8/2010 | Jones et al. | 385/73 |
| 7,806,599 B2 | 10/2010 | Margolin et al. | 385/75 |
| 7,837,392 B2 | 11/2010 | Niebling et al. | 385/58 |
| 7,841,777 B2 | 11/2010 | Howard et al. | 385/75 |
| 8,083,547 B2 * | 12/2011 | Roth et al. | 439/607.23 |
| 2003/0068135 A1 * | 4/2003 | Watanabe et al. | 385/53 |
| 2003/0169991 A1 | 9/2003 | Malevanets et al. | 385/134 |
| 2004/0141693 A1 * | 7/2004 | Szilagyi et al. | 385/55 |
| 2004/0161218 A1 | 8/2004 | Sloan et al. | 385/136 |
| 2008/0247709 A1 * | 10/2008 | Eguchi et al. | 385/60 |
| 2009/0136183 A1 * | 5/2009 | Kahle et al. | 385/72 |
| 2009/0182911 A1 | 7/2009 | Krasner et al. | 710/63 |
| 2010/0215322 A1 * | 8/2010 | Matsumoto et al. | 385/78 |
| 2011/0229094 A1 | 9/2011 | Isenhour et al. | 385/92 |

FOREIGN PATENT DOCUMENTS

| | | |
|---|---|---|
| JP | 53141644 A | 12/1978 |
| JP | 2005-62580 | 2/2005 |
| WO | WO 2006/086153 A1 | 8/2006 |

OTHER PUBLICATIONS

PCT International Search Report, Application No. PCT/US2011/028935, Aug. 9, 2011, 4 pages.

PCT International Preliminary Report on Patentability, Application No. PCT/US2011/028935, Sep. 25, 2012, 5 pages.

European Patent Office Rule 161B, Application No. 11710390.3-1234, Nov. 2, 2012, 9 pages.

Fiber Optic Connector with Built-in Shutter, Research Disclosure, Mason Publications, Hampshire GB. vol. 275, No. 6, Mar. 1, 1987, 2 pages.

* cited by examiner

FIBER OPTIC INTERFACE DEVICE WITH POSITIONABLE CLEANING COVER

CLAIM OF PRIORITY

This application claims the bennefit of priority under 35 U.S.C. §119(e) of U.S. Provisional Application Ser. No. 61/315,419 entitled "Ferrules for Small Form Consumer Electronics Optical Links," filed on Mar. 19, 2010, and Provisional Application Ser. No. 61/315,427 entitled "On Axis Lens Design, Optical Link for Small Form Factor Consumer Electronics Devices" filed on Mar. 19, 2010.

FIELD

The present disclosure relates generally to fiber optic interface devices, and in particular relates to fiber optic interface devices having a cleaning cover.

BACKGROUND

Optical fiber is increasingly being used for a variety of applications, including but not limited to broadband voice, video, and data transmission. As consumer devices are steadily using more bandwidth, fiber optic interface devices for these devices will likely move away from electrical connections and toward using optical connections for increased bandwidth. Generally speaking, conventional fiber optic interface devices used for telecommunication networks and the like are not suitable for consumer electronic devices.

For instance, conventional fiber optic interface devices are relatively large compared with the consumer devices and their interfaces. Additionally, conventional fiber optic interface devices are deployed with great care into relatively clean environments and/or cleaned by the craft before connecting the same. Further, even though fiber optic interface devices are reconfigurable (i.e., suitable for mating/unmating), they are not intended for a relatively large number of mating cycles. Instead, conventional fiber optic interface devices are high-precision connectors designed for reducing insertion loss between mating fiber optic interface devices in the optical network.

On the other hand, the consumer electronic devices are expected to have a relatively large number of mating/unmating cycles during ordinary operation. The consumer electronic devices will be operated in a multitude of environments where dirt, dust, and other debris are encountered on a regular basis. Further, consumer electronic devices typically have size and space constraints for making connections. Consequently, there is an unresolved need for fiber optic interface devices suitable for consumer electronic devices that can be maintained in a relatively clean state.

SUMMARY

An aspect of the disclosure is a fiber optic interface device that supports at least one optical fiber. The device includes a housing having a front end, sides and an interior. The device also includes a ferrule. The ferrule has a rear section supported in the housing interior and a front section having a surface. The ferrule front section extends from the housing front end. The ferrule is configured to support the at least one optical fiber to provide at least one optical path from the ferrule rear end to at least one optical path interface at the front-section surface. The device also includes a cover. The cover is positionable in open and closed positions and is moveably secured to the housing. The cover supports a cleaning member. The cover is configured to be placed in the closed position such that the cleaning member is proximate to the at least one optical path interface. When the cover is placed in the open position, the cleaning member is clear of the at least one optical path interface, i.e., the at least one optical interface is exposed.

Another aspect of the disclosure is a fiber optic interface device having at least one optical path interface. The device includes a housing having a front end, sides and an interior. The device also has a ferrule, which is supported by the housing and has an outer surface and a front surface, at least one of which surfaces supports the at least one optical path interface. The device also includes a positionable cleaning cover having a cleaning member. The positional cleaning cover is pivotably engaged with the housing. The positionable cleaning cover is pivotable between a closed position that places the cleaning member in contact with or proximate to the at least one optical path interface and an open position that exposes the at least one optical path interface.

Another aspect of the disclosure is a fiber optic interface device having at least one optical path interface. The device includes a housing having a front end, sides and an interior. The device has a ferrule supported by the housing. The ferrule has an outer surface and a front surface, at least one of which supports the at least one optical path interface. The device also has a positionable cleaning cover having a cleaning member. The positional cleaning cover is slideably engaged with the housing. The positionable cleaning cover is slideable between a closed position that places the cleaning member in contact with or proximate to the at least one optical path interface, and an open position that exposes the at least one optical path interface.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various exemplary embodiments of the disclosure, and together with the description serve to explain the principles and operations of the disclosure.

DETAILED DESCRIPTION

Figure 1A:
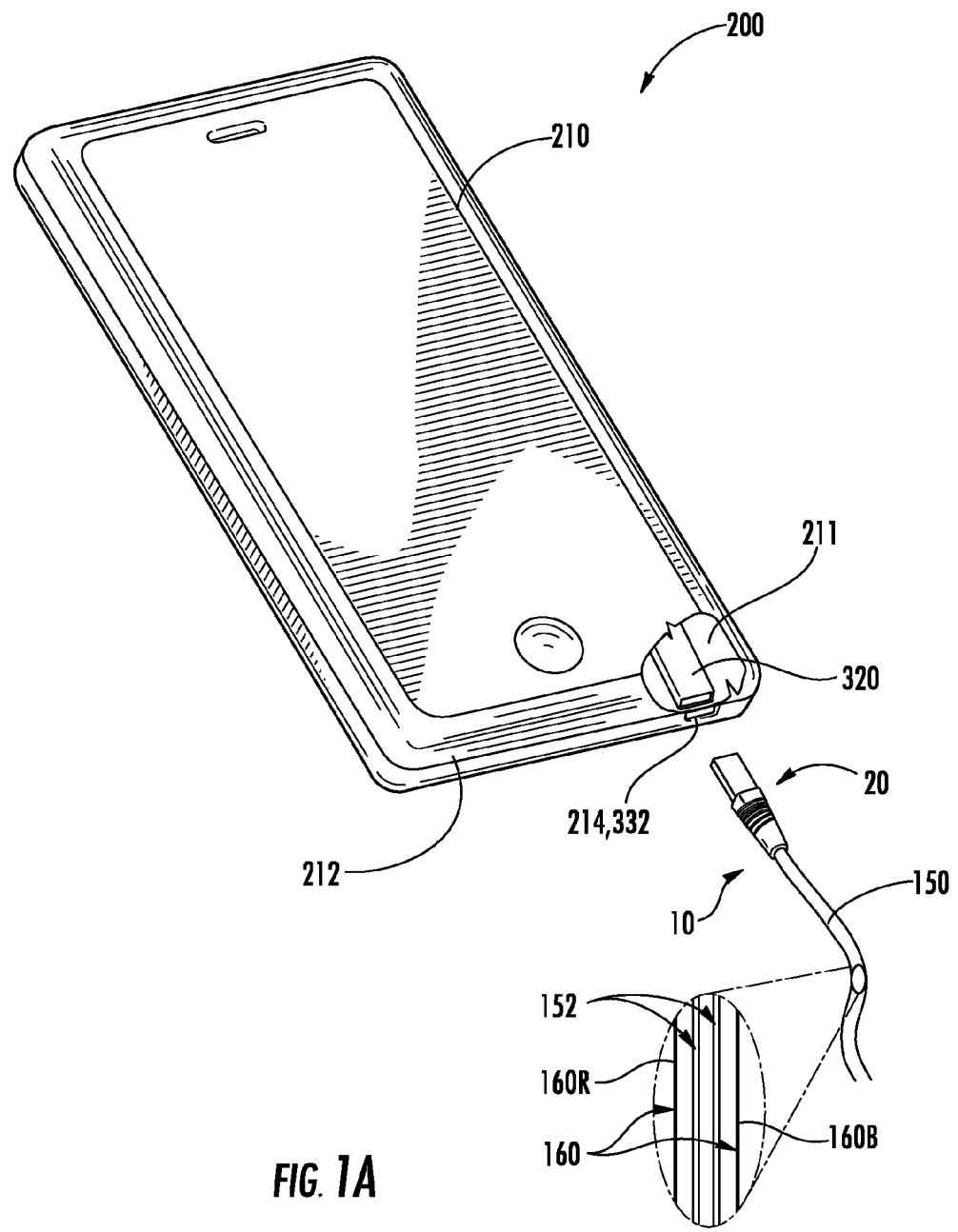
FIG. 1A is an elevated view of an example fiber optic cable assembly next to an electronic device.

Reference is now made in detail to the present preferred embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

In some of the Figures, Cartesian coordinates are shown for reference. Also, the terms "plug" and "receptacle" are used as shorthand for different types of fiber optic interface devices for the sake of distinguishing different parts of an interface device assembly. Further, in some of the examples discussed below, the receptacle is part of an electronic device, and a plug is used to plug into the receptacle of the electronic device.

In the discussion below, the term "electronic device" means a device that has either electronic or optical and electronic components and functionality, including a receptacle and associated hardware configured to receive, transmit or both transmit and receive optical signals and also configured to communicate electrical power.

The fiber optic interface devices, fiber optic interface assemblies, and cable assemblies described herein are suitable for making optical or both optical and electrical connections for a variety of devices, and are particularly well suited for consumer electronic devices. The concepts of the disclosure advantageously allow the simple, quick, and economical connection and disconnection of the fiber optic interface devices for a relatively large number of mating cycles.

The term "proximate" as used herein in connection with positioning of cleaning member 170 relative to optical path interface OPI, and means that the cleaning member is positioned such that it does not necessarily contact the optical path interface, but is sufficiently close thereto so that the cleaning member may come into contact with the optical path interface when moved, i.e., during a transition the from closed position to the open position of the positionable cover 100

Also, the open position is where the optical path interface is uncovered or "exposed" so that it can optically communicate or otherwise be optically interfaced with another optical path of another fiber optic interface device.

FIG. 1A is an elevated view of an example fiber optic cable assembly 10 next to an electronic device 200. Electronic device 200 includes a housing 210 that defines a housing interior 211 that contains a fiber optic interface device 320. Housing 210 includes a side 212, and fiber optic interface device 320 is disposed adjacent side 212. Electronic device housing side 212 includes an aperture 214 that leads to a front aperture 332 of fiber optic interface device 320. Fiber optic interface device 320 is configured to receive a plug-type fiber optic interface device 20. Accordingly, fiber optic interface device 320 is referred to hereinbelow as receptacle 320.

Fiber optic cable assembly 10 includes a fiber optic interface device 20 operably connected to a fiber optic cable 150. In an example, fiber optic cable 150 carries at least one optical fiber 152, e.g., two optical fibers with one being a transmit optical fiber and the other a receive optical fiber for respectively carrying transmit and receive optical signals. Each optical fiber 152 has an end 152E (see FIG. 3A, introduced and discussed below).

Also in an example embodiment, fiber optical cable 150 carries at least one electrical wire 160, e.g., two electrical wires 160B and 160R ("black and red") that can carry electrical power. In the example where fiber optic cable 150 carries at least one optical fiber 152 and at least one electrical wire 160, fiber optic interface device 20 provides both optical and electrical communication and functionality.

The fiber optic cable assemblies 10 discussed herein have a fiber optic interface device 20 configured to mate with receptacle 320 of electronic device 200. Accordingly, the fiber optic interface devices 20 discussed below are each referred to as plug 20. Plugs 20 discussed below each support at least one optical path interface OPI. An aspect of the disclosure includes plug 20 having a positionable cleaning cover ("cover") 100 that can clean the at least one optical path interface OPI and that can also maintain the at least one optical path interface in a substantially clean state when plug 20 is not matingly engaged with a receptacle 320. Different example embodiments of positionable cleaning covers 100 are discussed below.

Figure 1B:
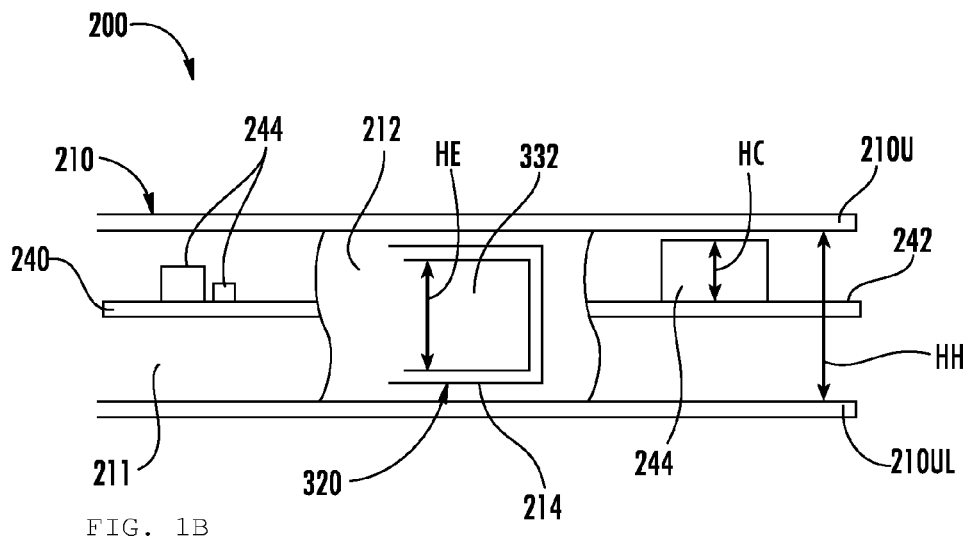
FIG. 1B is a close-up end-on view of an example receptacle in the electronic device along with a circuit board and circuit board components, illustrating the relative sizes of the receptacle aperture, the electronic device housing and the circuit board components.

FIG. 1B is a close-up end-on view of an example receptacle 320 as disposed in electronic device 200. Electronic device housing 210 has upper and lower walls 210U and 210L that define an interior height HH for electronic device interior 211. Receptacle 320 is supported by a circuit board 240 supported within electronic device interior 211. Circuit board 240 has an upper surface 242. Circuit board upper surface 242 operably supports one or more circuit board components 244, including at least one having a height HC, which height represents the greatest height of the various circuit board components as measured relative to circuit board upper surface 242. Receptacle aperture 332 has a height HE.

In an example, HC<HE<HH. Also in an example, HE is in the range from about 2 mm to about 4 mm, while in another example, HH is in the range from about 3 mm to about 10 mm. An example height HC is in the range from 1.5 mm to 3 mm. In an example, height HC is defined by the height of a microprocessor such as used in hand-held and other portable electronic devices 200.

Plug with Pivotable Cover

Figure 2:
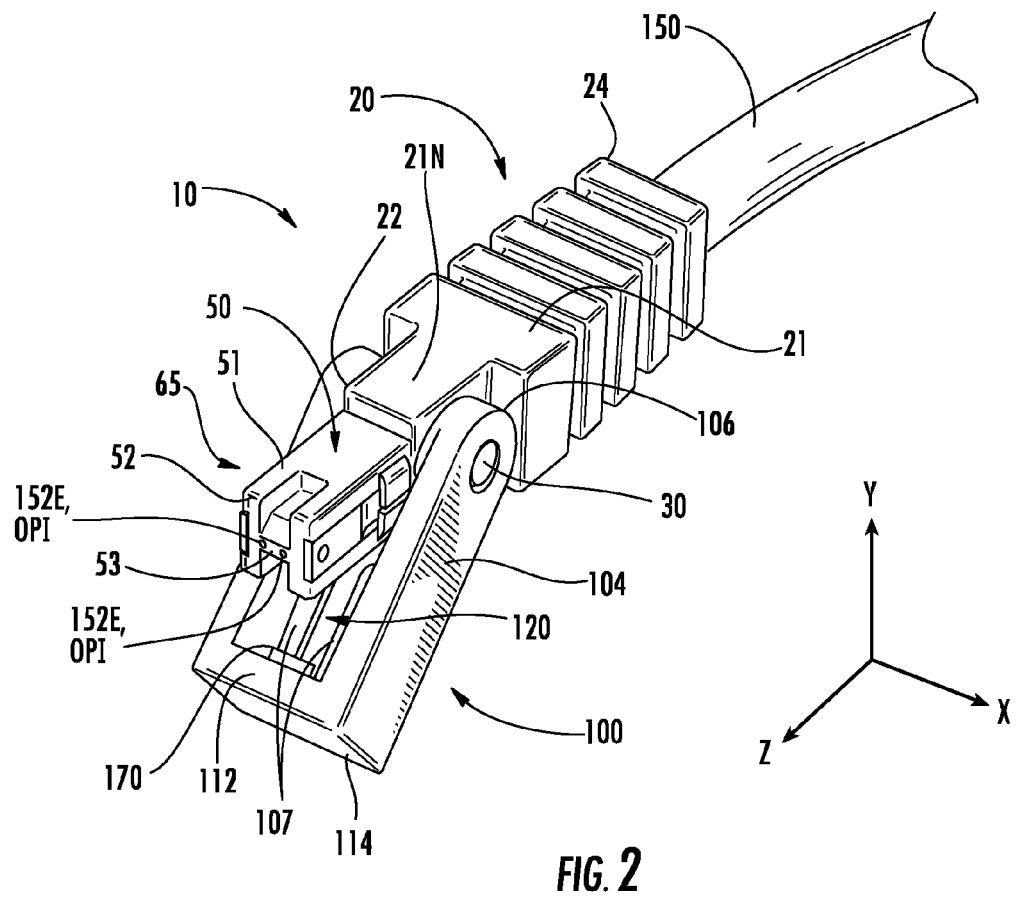
FIG. 2 is a front elevated view of an example fiber optic cable assembly having an example plug with a hinged positionable cover, with the cover shown in a partially opened position.

FIG. 2 is a front elevated view of an example fiber optic cable assembly 10 having an example plug 20. Plug 20 includes a cover 100 that can pivot between a closed position and an open position, as discussed in greater detail below. Plug 20 has a central axis A0, and includes a housing 21 having a central axis A1, a front end 22 and a rear end 24. Housing 21 also has an interior 25 with an opening 23 at front end 22 and an opening 27 at rear end 24, as best viewed in FIG. 10A, introduced and discussed below. Housing 21 includes sides 26 having respective protuberances 30 associated with pivotable cover 100. Housing 21 is configured to support a fiber optic ferrule 50 (hereinafter ferrule 50) that has a front end 52.

Figure 3A:
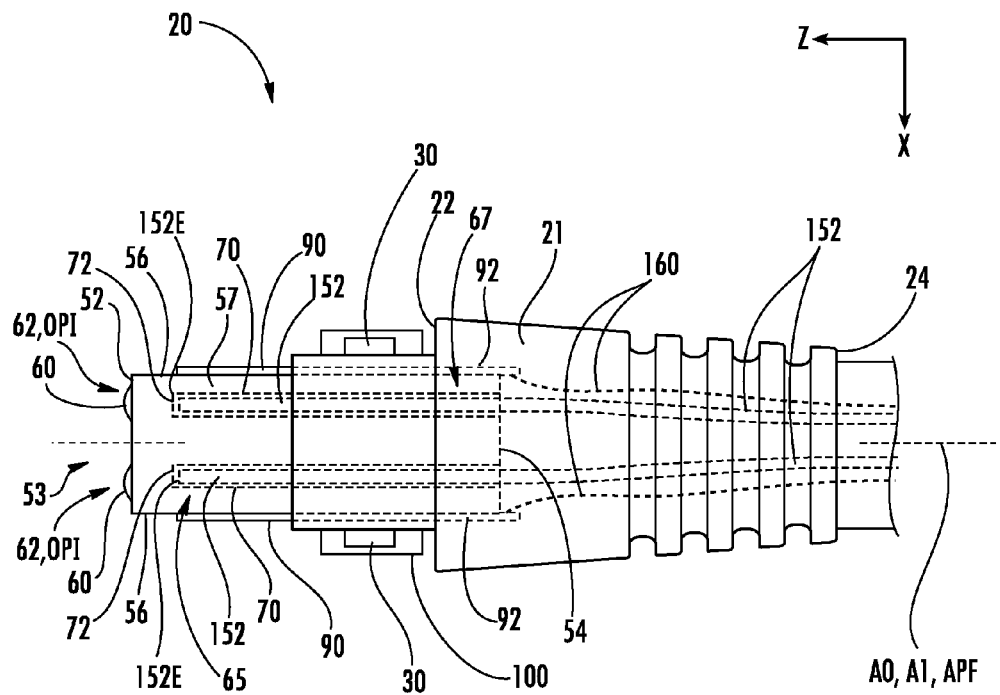
FIG. 3A is a top-down view of the plug and positionable cover of FIG. 2, wherein the plug includes a ferrule with two lenses on the ferrule front surface, and where the positionable cover is swung down into the open position.
Figure 3B:
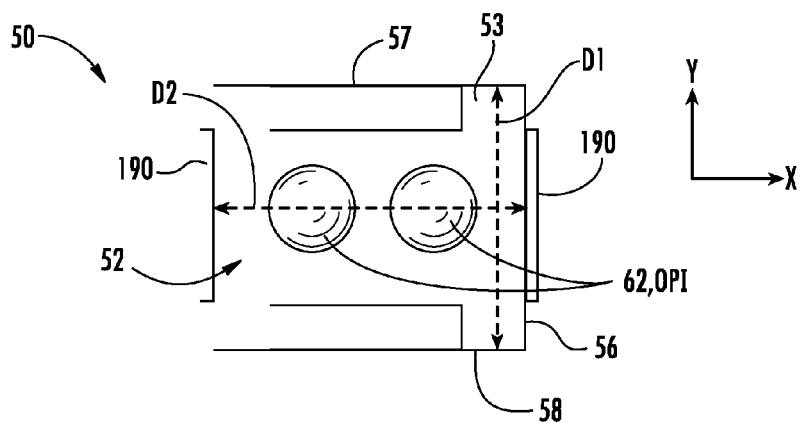
FIG. 3B is a front-on view of the ferrule of the plug of FIG. 3A.

FIG. 3A is a top-down view of an example plug 20 with an example ferrule 50 that supports two optical path interfaces OPI at ferrule front end 52. The positionable cover 100 is in the open position in FIG. 3A and therefore is not entirely visible, i.e., it is pivoted downward below plug 20. FIG. 3B is a front-on view of the example ferrule 50 of FIG. 3A that shows the two optical path interfaces OFI as defined by respective lenses 62. Generally, ferrule 50 supports at least one optical path interface OPI. Also in an example, the at least one optical path interface OPI includes at least one lens 62 or includes at least one optical waveguide end face 152E, or includes both. Example lenses 62 include refractive lenses, diffractive lenses, gradient-index (GRIN) lenses, and the like.

With reference to FIG. 2, FIG. 3A and FIG. 3B, ferrule 50 extends from housing front end 22. Ferrule 50 has a body 51 with a central axis APF, and front end 52 that has a surface 53 (FIG. 3B) and a rear end 54. Ferrule body 51 also has sides 56, an upper surface 57 and a lower surface 58. Ferrule 50 includes a central axis APF that in an example is generally aligned with housing axis A1 and plug axis A0. In an example, axes A0, A1 and APF are coaxial. Ferrule 50 includes a front section 65 with an outer surface 66, with the front section extending from housing 21. Ferrule 50 also includes a rear section 67 that resides within interior 25 of housing 21 (see FIG. 10A).

In the example ferrule 50 of FIGS. 3A and 3B, front surface 53 includes curved surface portions 60 that defines two lenses 62 and that serves as first and second optical path interfaces OPI. In the example ferrule 50 of FIG. 2, front surface 53 includes first and second fiber ends 152E that serve as first and second optical path interfaces OPI. In both examples, the optical path interfaces OPI are supported at ferrule front end 52. Generally, one or more optical path interfaces OPI can be supported at ferrule front end 52, and two such optical path interfaces are shown by way of example.

In an example where ferrule 50 includes lenses 62, the ferrule can be made of a material that is substantially transparent to wavelengths in the range from 800 nm to 1600 nm. Example materials for ferrule 50 include a transparent resin such as Polyetheremide (PEI), sold by the General Electric Company under the trademarked name ULTEM® 1010.

In an example, ferrule 50 operably supports at least one optical fiber 152. In the example of FIG. 2 and FIGS. 3A and 3B, ferrule body 51 includes at least one bore 70 that runs from ferrule rear end 54 and generally parallel to ferrule central axis APF. In the case of ferrule 50 of FIGS. 3A and 3B, the at least one bore 70 has an end 72 internal to the ferrule body 51 and adjacent ferrule front end 52. The at least one bore 70 is aligned with the at least one lens 62 of ferrule front surface 53. Bore 70 supports optical fiber 150, with optical fiber end 152E at or near bore end 72. In an example, bore end 72 is axially spaced apart from lens front surface 60 by about one focal length.

Ferrule 50 also optionally supports plug electrical contacts 90 on ferrule sides 56. Electrical contacts 90 have respective rear sections 92 that reside within housing 21. In an example, electrical contacts 90 are used to conduct electrical power. Electrical contacts 90 are connected to electrical wires 160 at respective rear sections 92.

Figure 4A:
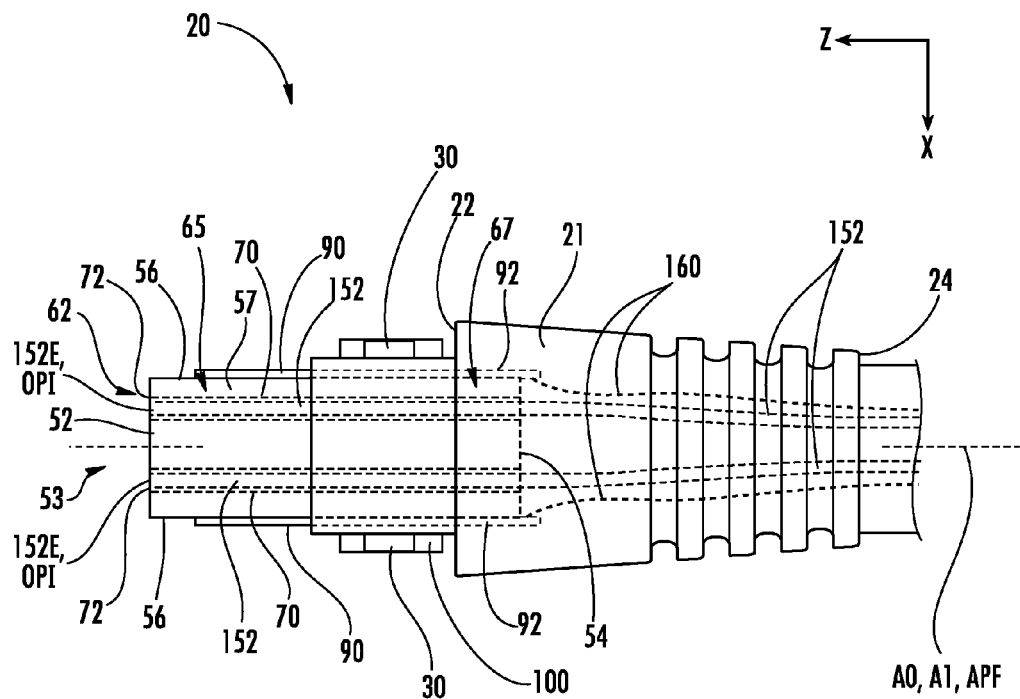
FIG. 4A is similar to FIG. 3A and illustrates an example plug where the ferrule supports the optical fibers such that they terminate at or near the ferrule front end.
Figure 4B:
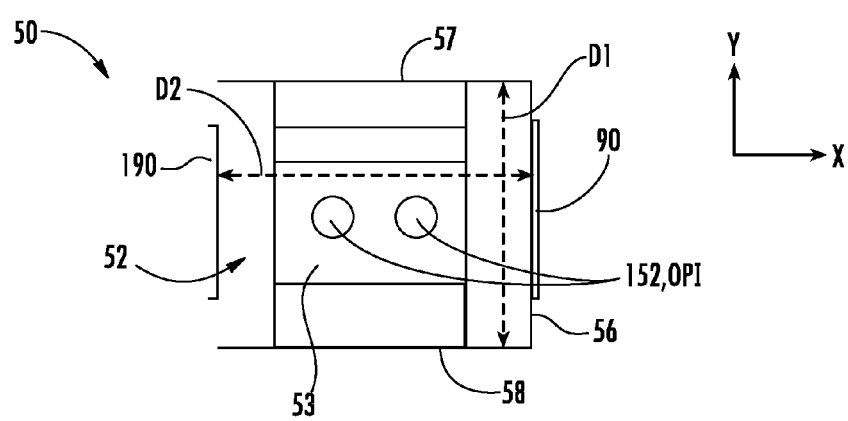
FIG. 4B is a front-on view of the ferrule of the plug of FIG. 4A.

FIG. 4A is similar to FIG. 3A and illustrates an example plug 20 similar to that shown in FIG. 2 wherein bores 70 have bore ends 72 at ferrule front end 52, and optical fibers 152 have their respective ends 152E at or adjacent ferrule end 52. FIG. 4B is similar to FIG. 3B and is a front-on view of ferrule 50 of FIG. 4A. In this example embodiment, ferrule front surface 53 has no lenses and is thus essentially planar. In this case, optical fiber ends 152E each respectively define an optical path interface OPI.

With reference to FIG. 3B and FIG. 4B, in an example, ferrule 50 has at least one transverse dimension D1 and D2 in the range from about 2 mm to about 4 mm.

Figure 5A:
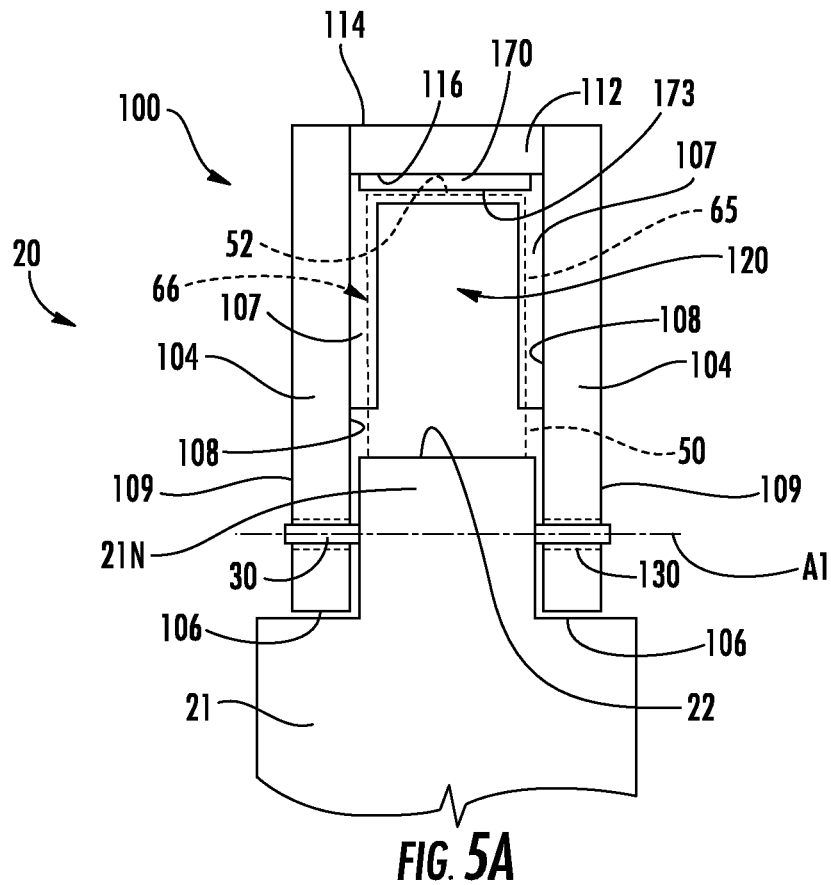
FIG. 5A is a top-down view of an example plug and positionable cover, showing the front section of the housing and also showing the ferrule front section in phantom, with the positionable cover in the closed position.
Figure 5B:
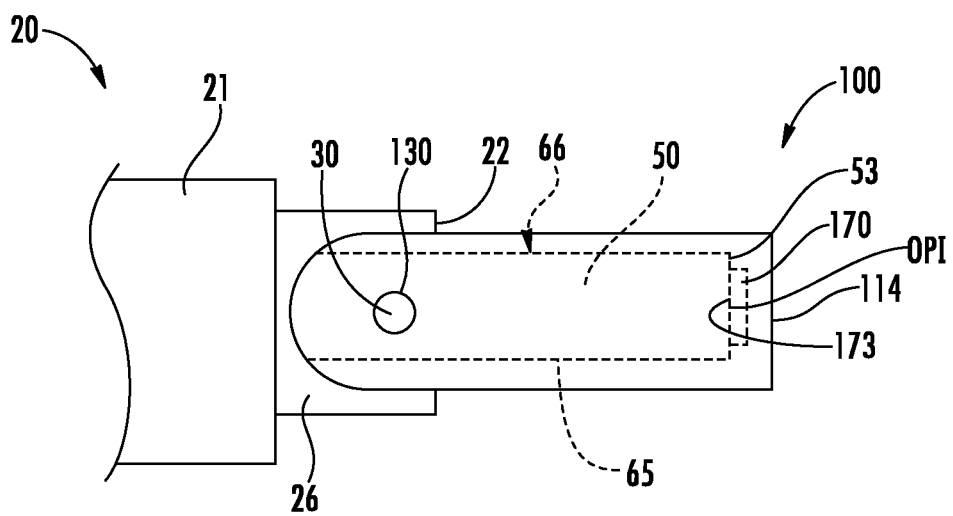
FIG. 5B is a side view of the example plug and positionable cover of FIG. 5A, with the positionable cover in the closed position.
Figure 6:
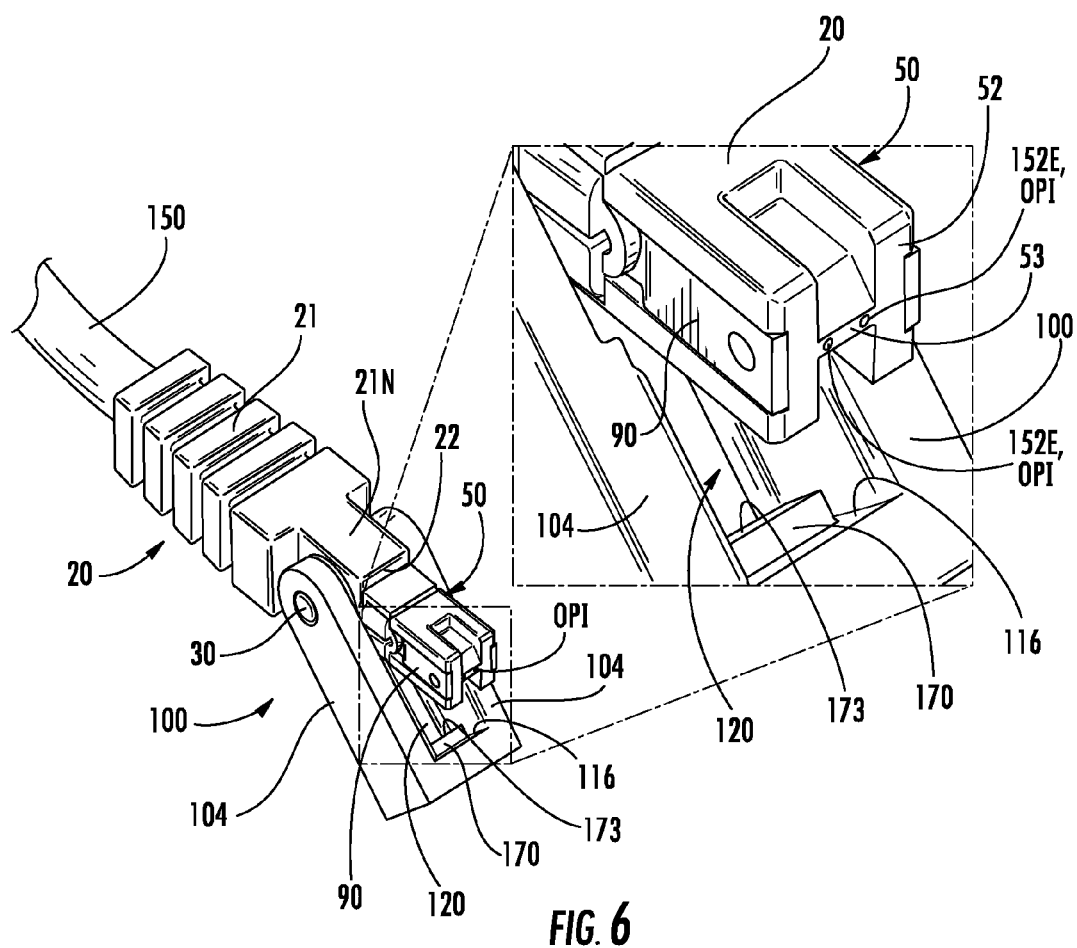
FIG. 6 is a front-end elevated view similar to FIG. 2 and including a close-up inset that shows details of a portion of the positionable cover, with the positionable cover in a partially opened position.

Plug 20 includes the aforementioned pivotable cover 100. An example pivotable cover 100 is shown in the top-down and side views of FIG. 5A and FIG. 5B respectively, along with the front section of housing 21. FIG. 6 is a perspective view of plug 20 that includes a close-up inset of the front portion of pivotable cover 100. Pivotable cover 100 has a general U-shape with two arms 104 and an end wall 112. End wall 112 defines a positionable cover end 114 while the two arms 104 have respective ends 106. Arms 104 also have respective inner and outer surfaces 108 and 109, and end wall 112 has an inner surface 116, with the inner walls defining a U-shaped opening 120 within pivotable cover 100. U-shaped opening 120 is sized to accommodate a front-end nose portion 21N of housing 21 and the front-end portion 65 of ferrule 50, which is shown in phantom in FIG. 5A and FIG. 5B.

Arms 104 include through-holes 130 near ends 106 that extend from inner surface 108 to outer surface 109 and that are sized to accommodate protuberances 30 that reside on the sides 26 of housing 21 near housing front end 22. Protuberances 30 are aligned with each other along an axis A1. This configuration allows cover 100 to pivotably engage housing 21 and forms a hinge with pivoting axis A1, thereby allowing a user to position pivotable cover 100 in an open or closed position by rotating the positionable cover around the pivoting axis. Other configurations forming such a pivoting hinge can be used to achieve the same functionality.

Figure 7A:
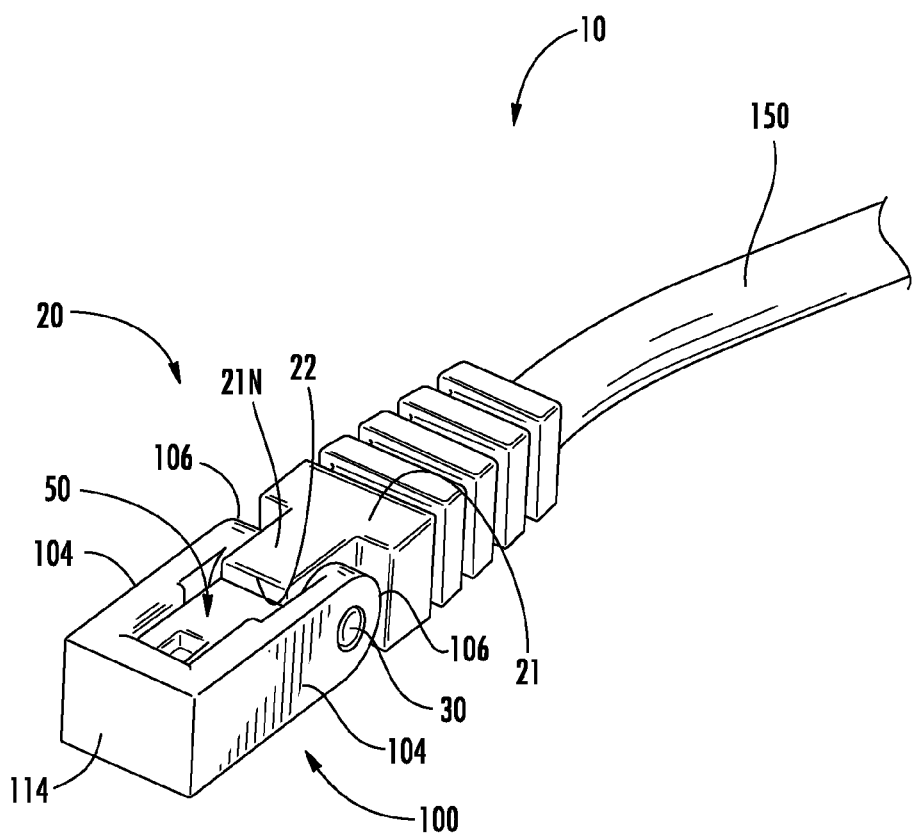
FIG. 7A is similar to FIG. 6, but with the positionable cover in the closed position.

Pivotable cover 100 includes at least one ledge 107 that extends from at least one of end wall inner surface 116 and inner surface 108 of arms 104. Ledge 107 serves as a stopping surface that contacts ferrule 50 when pivotable cover 100 is in the closed position, i.e., engaged with ferrule 50, as shown in FIG. 5B and FIG. 7A, for example. Ledge 107 thus prevents pivotable cover 100 from swinging beyond the closed position, e.g., over to the other side of ferrule 50.

Figure 7B:
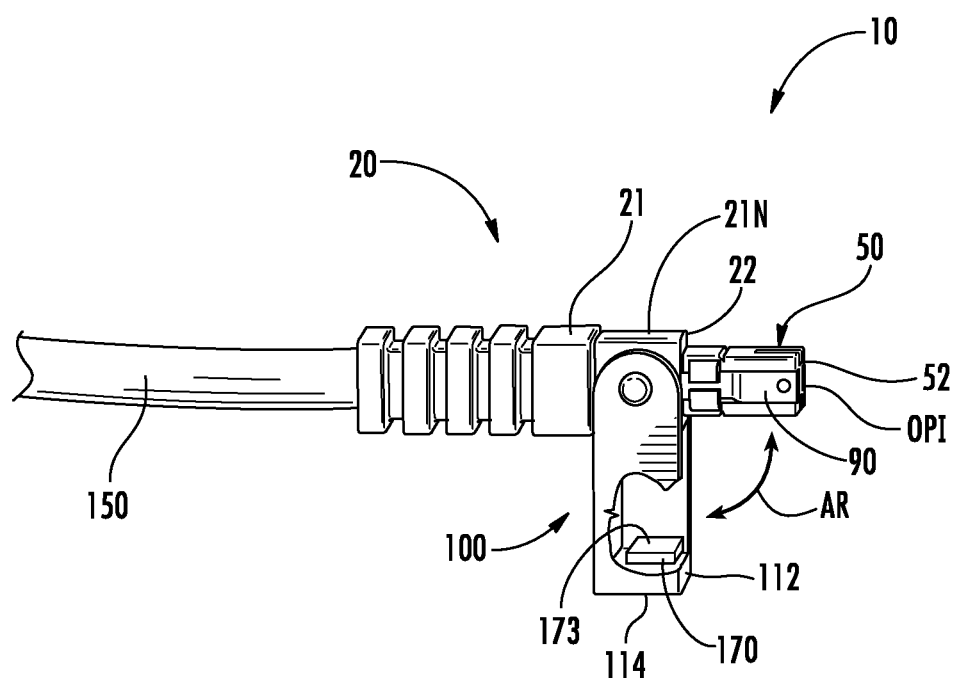
FIG. 7B is similar to FIG. 7A, but with the positionable cover in the completely open position.

Pivotable cover 100 is configured so that ferrule 50 (and side electrical contacts 90, if present) snugly fits within U-shaped opening 120 so that frictional forces prevent the pivotable cover from easily transitioning from the closed position (FIG. 7A) to the open position (see, e.g., FIG. 7B illustrating a fully open position or FIG. 6 illustrating a partially open position). In an example, the aforementioned frictional forces are overcome by the opening force of a user's finger applied to pivotable cover 100 to rotate the cover from the closed to the open position. Arrow AR in FIG. 7B illustrates the pivoting motion of pivotable cover 100.

End wall inner surface 116 of pivotable cover 100 supports a cleaning member 170 having a cleaning surface 173 that contacts or that is proximate to ferrule front surface 53 when pivotable cover 100 is placed in the closed position. Cleaning member 170 is made of a material suitable for cleaning ferrule front surface 53 and may include for example, cloth or a fibrous material, a coating, an abrasive, cleaning paper, polymer cleaning material, alcohol, or cotton. In an example, cleaning member 170 is resilient so that ferrule front end 52 compresses the cleaning member when pivotable cover 100 is in the closed position. In an example, cleaning member 170 is textured, and in another example has an amount of porosity that allows it to absorb small amounts of fluid and also retain contaminants, e.g., dirt, dust, debris, etc.

Note that the process of placing pivotable cover 100 in the closed and open position can allow cleaning member 170 to serve to wipe clean the at least one optical path interface OPI supported at ferrule front surface 53. In addition, the closed position serves to maintain the cleanliness of the at least one optical path interface OPI.

Plug with Slideable Cover

Figure 8A:
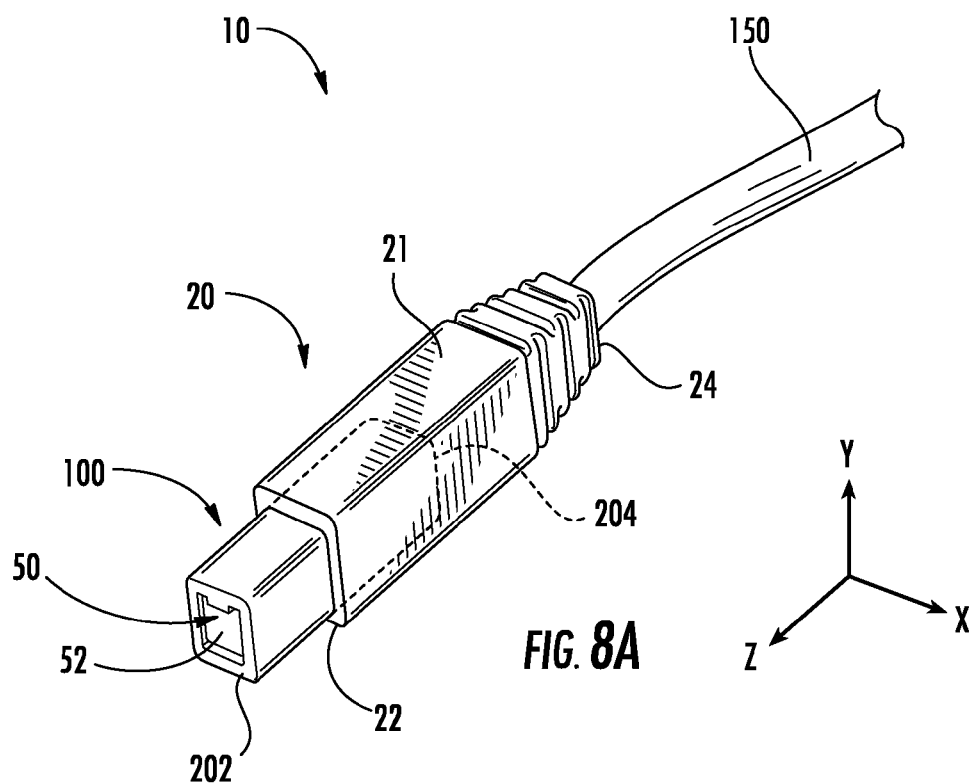
FIG. 8A is a front elevated view of an example plug that includes a sliding positionable cover, with the positionable cover shown in the closed position.
Figure 8B:
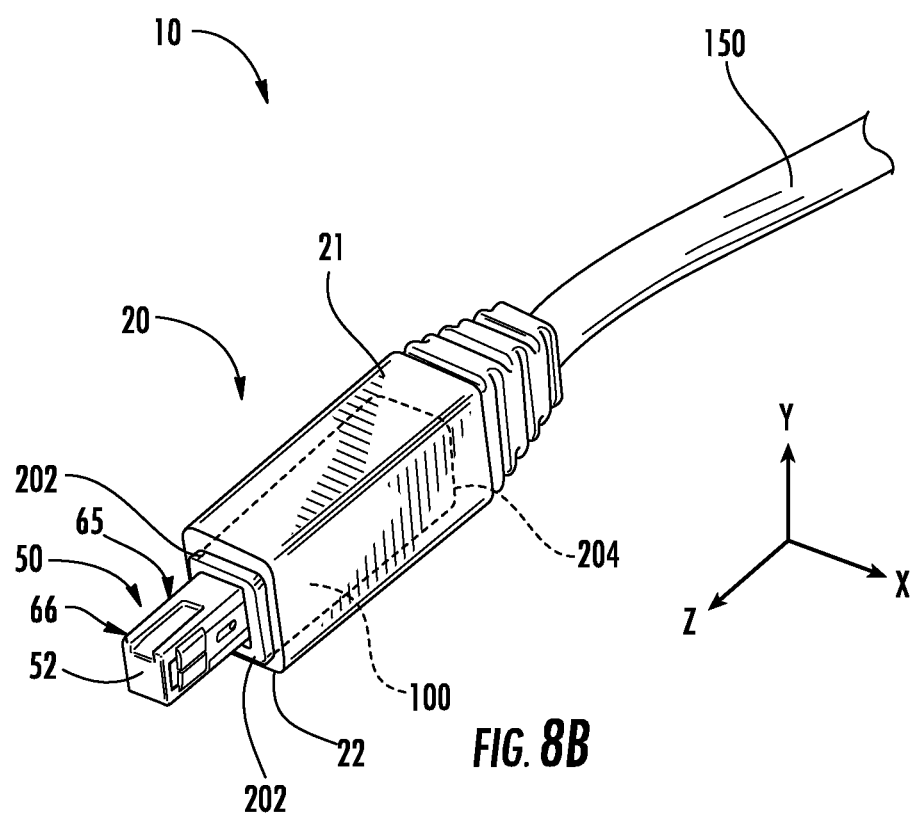
FIG. 8B is similar to FIG. 8A but with the positionable cover shown in the open position.

FIG. 8A is a front elevated view of an example fiber optic cable assembly 10 that includes a plug 20 and a sliding positionable cover ("slideable cover") 100, with the slideable cover in the closed position relative to ferrule 50 and housing 21. FIG. 8B is similar to FIG. 8A, but with slideable cover 100 in the open position relative to ferrule 50 and housing 21.

Figure 9A:
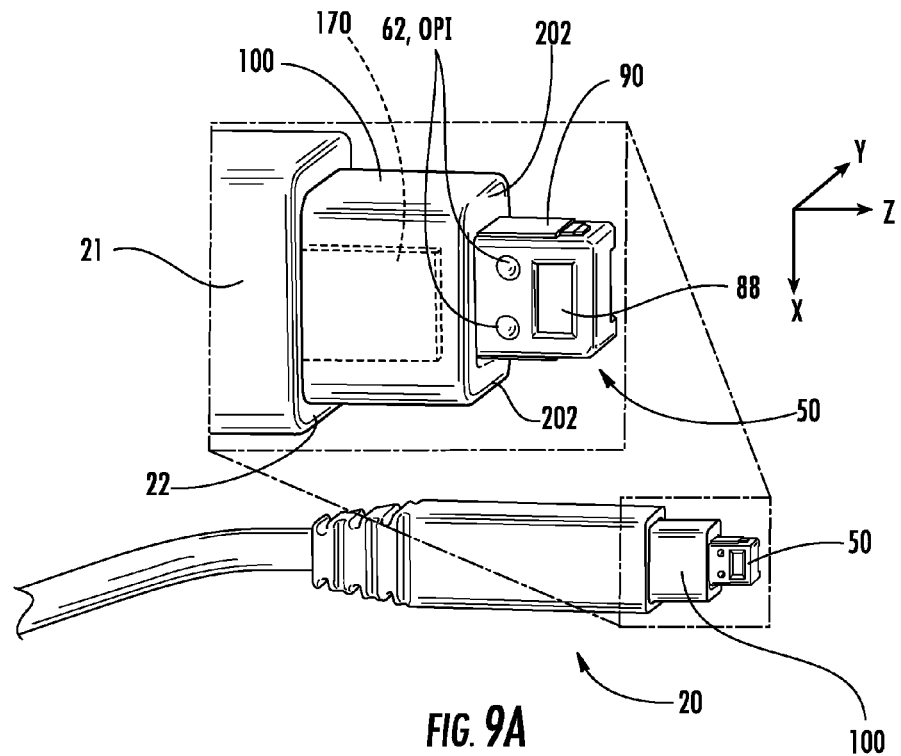
FIG. 9A is a side view of the plug of FIGS. 7A, 7B and FIGS. 8A, 8B, showing the positionable cover in a partially opened position and showing in the close-up inset the lenses on the side of the ferrule.
Figure 9B:
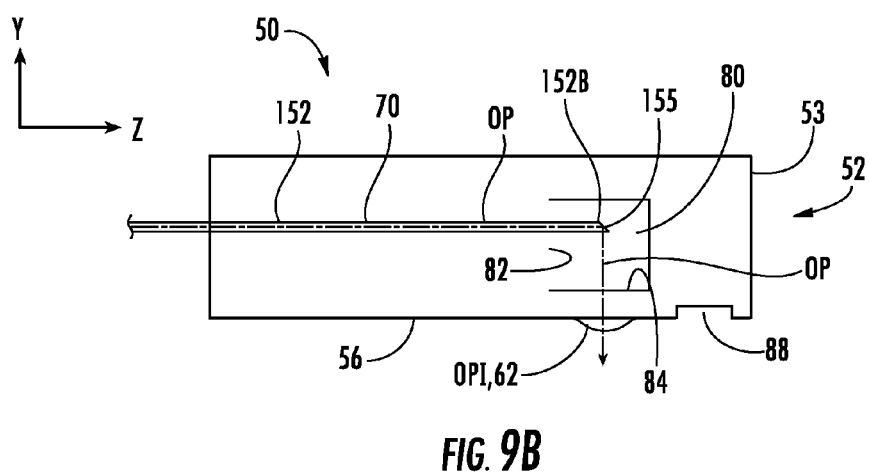
FIG. 9B is a cross-sectional view of an example of the ferrule of FIG. 9A as taken in the X-Z plane, and showing an example optical path having a right-angle turn that directs the optical path to the lenses on the side of the ferrule.
Figure 9C:
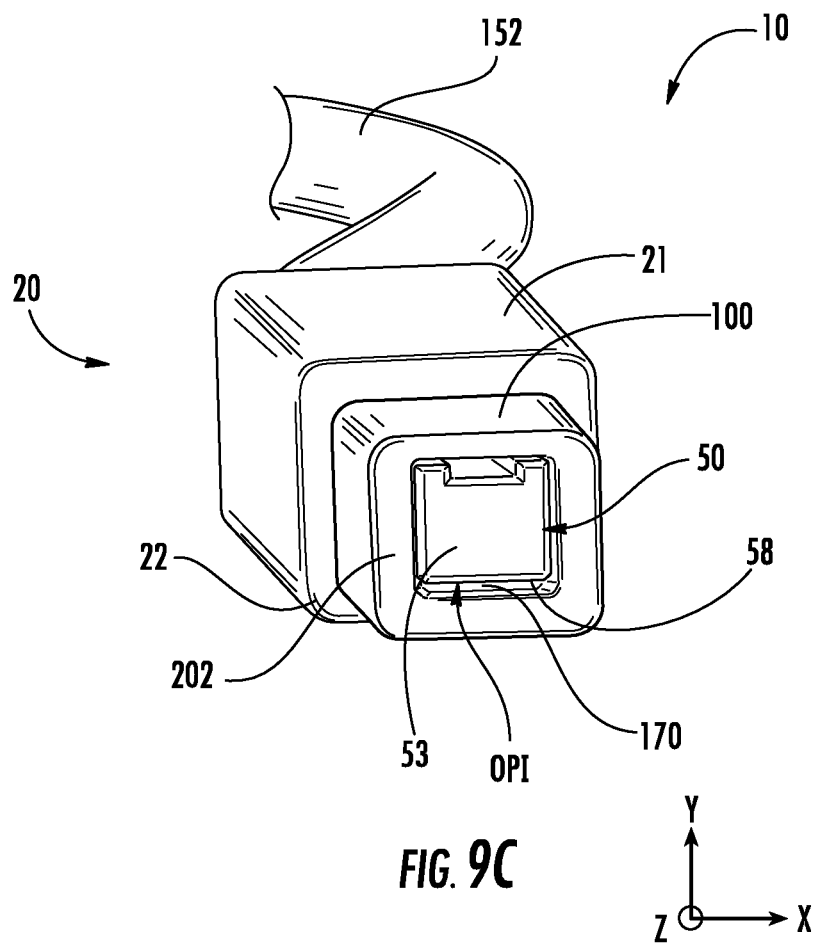
FIG. 9C is a front-end view of the ferrule of FIG. 9A, but rotated counter-clockwise by 90 degrees, and illustrating the positionable cover in the closed position.

In the present embodiment, ferrule 50 is configured so that the at least one optical path interface OPI is supported at the ferrule upper or lower surfaces 57 and 58 or at one or more of ferrule sides 56 rather than at front end 52. An example of such a ferrule 50 is illustrated in the plug 20 shown in FIG. 9A. FIG. 9B is a cross-sectional view of the ferrule of the plug 20 shown in FIG. 9A, with the cross-section taken in the Y-Z plane. FIG. 9C is a front-elevated view of plug 20 of FIG. 9A.

With reference to FIG. 9B, ferrule 50 includes lens 62 on side 56. Ferrule body 51 also includes an internal cavity 80 with a rear end wall 82 and a side wall 84. Optical fiber 152 is supported in bore 70 such that optical fiber 152 extends from rear end wall 82 and optical fiber end 152E resides within cavity 80. Optical fiber end 152E includes a facet 155 that serves to redirect the optical path OP toward side wall 84. Optical path OP is configured to align with lens 62 on side 56. Lens 62 defines optical path interface OPI. A keying feature 88 is shown on side 56 adjacent front end 52.

Figure 10A:
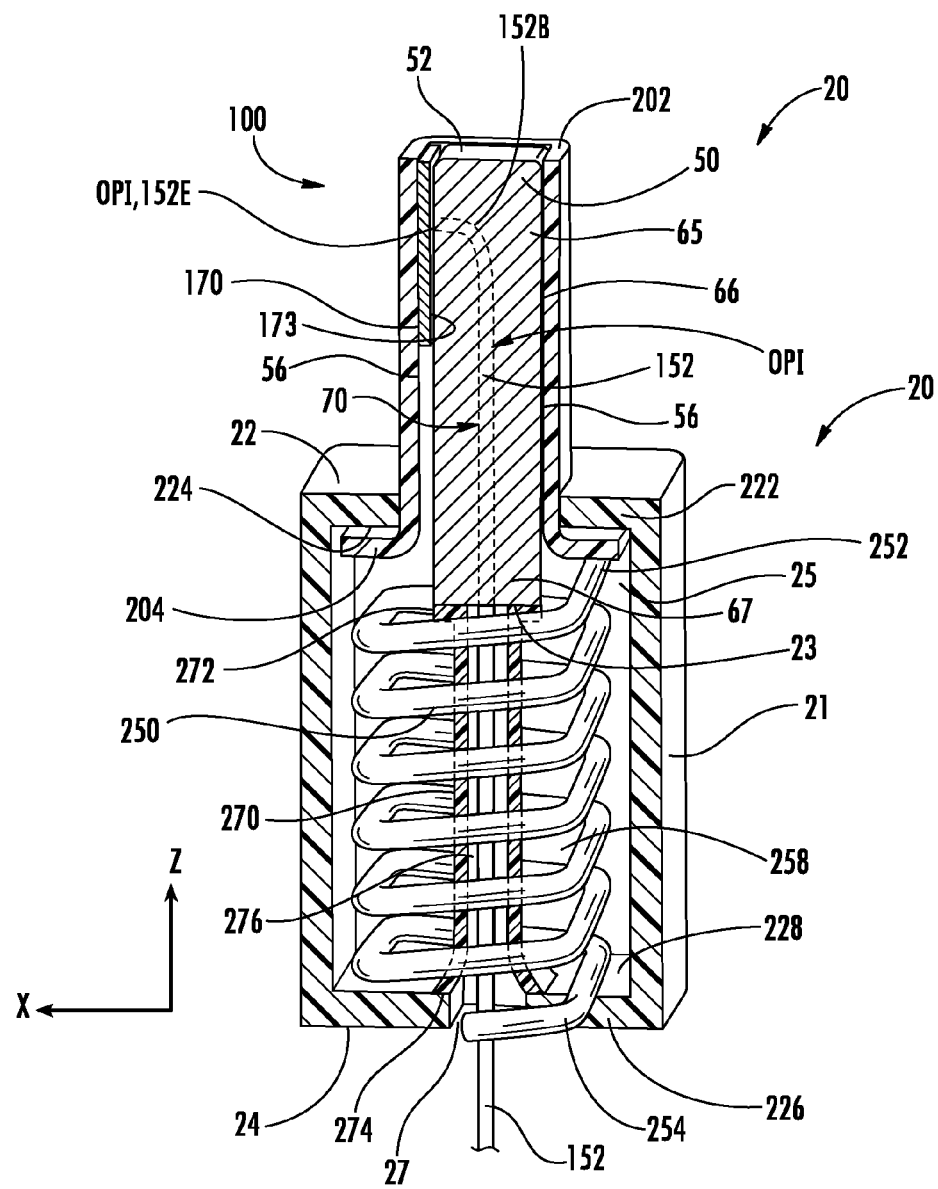
FIG. 10A is a cut-away view of an example plug showing the sliding positionable cover in the closed position, and illustrating an example where a resilient member in the housing is used to forward-bias the cover.

FIG. 10A is a cross-sectional view of an example plug 20 taken in the X-Z plane and illustrates an example internal configuration of housing 21 where the optical path interface OPI is supported on ferrule side 56 and where the configuration provides slideable cover 100 with a forward-biased (closed) position and a rear-biased (open) position. Housing 21 includes a front wall 220 that defines housing front end 22 and a front end opening 23. Front wall 220 also defines a front interior surface 224. Housing 21 also includes a rear wall 226 that defines housing rear end 24 and a rear end opening 27. Rear wall 226 has an interior surface 228.

Figure 10B:
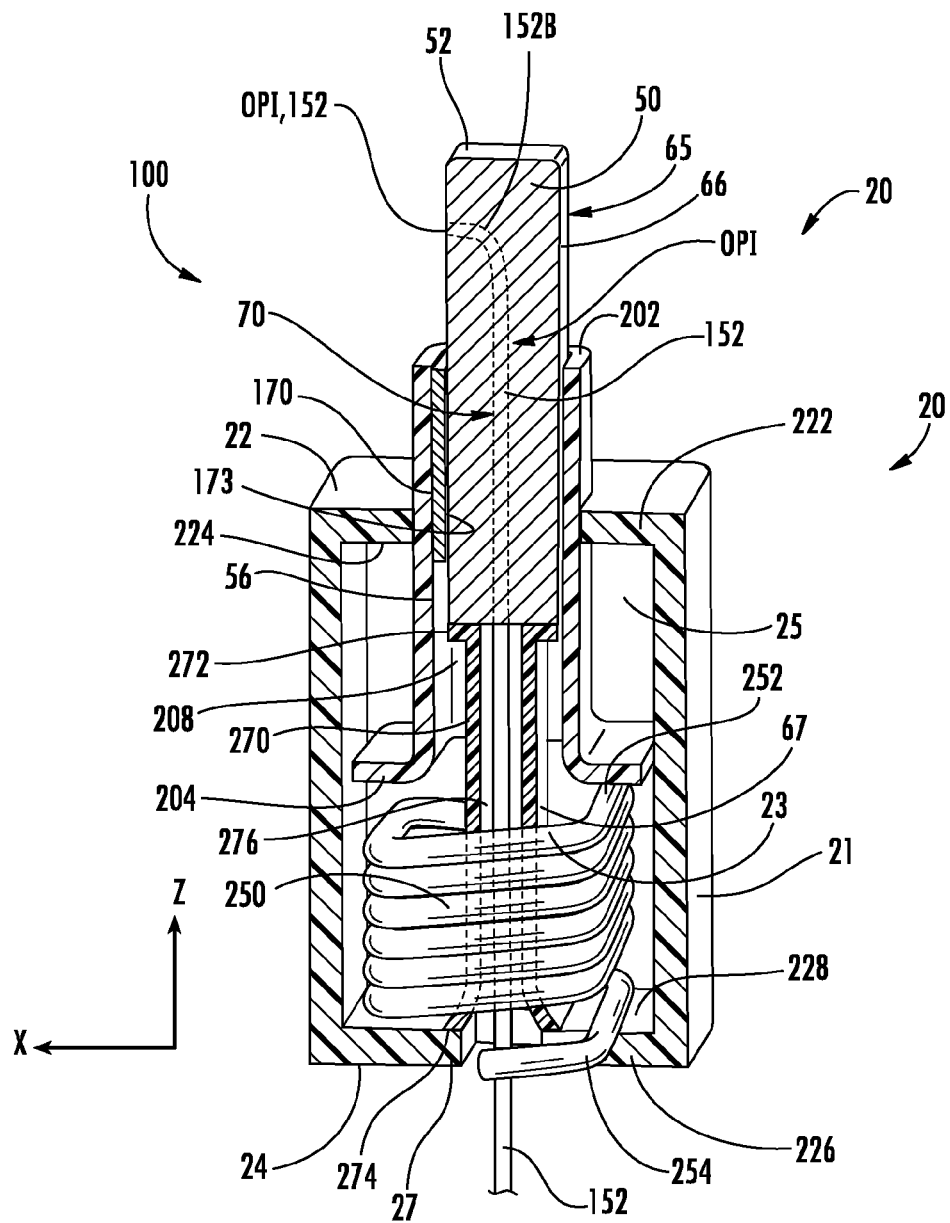
FIG. 10B is similar to FIG. 10A except that it shows the sliding positionable cover in an open position that exposes the at least one optical path interface.

In an example, slideable cover 100 is in the form of a sheath having a generally cylindrical shape with an open front end 202 and a flared rear end 204, and that defines an interior 208 (see FIG. 10B). Slideable cover 100 is configured so that ferrule front section 65 fits within interior 208 so that in the closed position, the slideable cover 100 substantially surrounds ferrule outer surface 66 of ferrule front section 65. Slideable cover 100 includes cleaning member 170 supported within cover interior 208 so that the cleaning member either contacts or is made proximate to the at least one optical path interface OPI supported by ferrule 50 at side 56. The optical path OP has a change in direction as formed by a bend 152B in optical fiber 152, and optical path interface OPI is defined by optical fiber end 152E residing at or slightly recessed from ferrule side 56.

Plug 20 includes a resilient member 250 operably supported in housing interior 25. Resilient member 250 has a front end 252 that resides towards front wall interior surface 224, and a rear end 254 that resides at interior surface 228 of housing rear wall 226. Resilient member 250 may also include an open central region 258 that allows for optical fiber 152 to pass from fiber optic cable 150 to ferrule 50. Open central region 258 may also be sized to accommodate ferrule rear section 67. In an example, resilient member 250 comprises a spring.

In an example, plug 20 also includes a ferrule support member 270 configured to support ferrule 50 at least partially within housing interior 25. In an example, ferrule support member 270 is in the form of a tube having a front end 272 and a flared rear end 274 and that defines interior 276 that can serve as a conduit. Ferrule support member 270 is arranged within open central region 258 of resilient member 250, with the support member front end 272 abutting ferrule rear end 54 and the support member rear end abutting housing rear wall 226 at interior surface 228. Optical fiber 152 passes through support member interior 276. In an example, support member front end 270 is configured to securely seat ferrule rear end 54. Thus, the example ferrule support member 270 shown in FIGS. 10A and 10B serves as a support pedestal for ferrule 50 to maintain the ferrule in a fixed position relative to housing 21.

Other configurations for ferrule support member 270 can be used to achieve the same functionality. For example, another embodiment of ferrule support member 270 can be fixed to housing inner walls with one or more beams, and slideable cover 100 can contain one or more slots configured to accommodate the beams when the slideable cover moves into the housing interior 25. In another example, ferrule 50 and ferrule support member 270 are formed as a unitary structure, while in a similar example ferrule 50 extends all the way to housing rear wall 226 through resilient member open central region 258, and ferrule rear end 54 is configured to be supported by the housing rear wall.

In the closed position as shown in FIG. 10A, essentially only the flared rear end 204 of slideable cover 100 resides within housing 21, with the flared end being in contact with front wall interior surface 224 of housing 21. Resilient member 250 is arranged so that resilient member front end 252 contacts slideable cover rear end 204. This provides a forward biasing force that prevents slideable cover 100 from sliding into housing interior 25 without the application of a rearward axial force on the slideable cover. In the closed position, cleaning member 170 resides on or proximate to the at least one optical path interface OPI supported on side 56 of ferrule 50.

In moving from the closed position to the open position, slideable cover 100 moves axially rearward and into housing interior 25 while compressing resilient member 250. FIG. 10B is similar to FIG. 10A and shows the slideable cover 100 in an example open position. In an example, about half of slideable cover 100 resides within housing interior 25 when the cover is in the open position.

In an example, receptacle 320 (FIG. 1A and FIG. 1B) is configured so that a front portion of the receptacle makes contact with front end 202 of slideable cover 100 and serves to push the rear portion of the slideable cover into housing interior 25 as plug 20 is inserted into receptacle 320.

The open position of cover 100 exposes front section 65 of ferrule 50 and the at least one optical path interface OPI supported by ferrule side 56. This position allows for optical communication to be established between plug 20 and the corresponding receptacle 320, such as shown in FIG. 1A and FIG. 1B.

When plug 20 is unmated, slideable cover 100 is forward-biased in the closed position that substantially surrounds surface 66 of ferrule front section 65. As slideable cover 100 moves from the open position to the closed position, in an example cleaning member 170 slides across the at least one optical path interface OPI, thereby removing at least some contaminants that may have accumulated on the optical path interface. This cleaning action is also repeated when slideable cover 100 moves from the closed position to the open position. While in the closed position, slideable cover 100 and cleaning member 170 serve to reduce the amount of contaminants that can collect on surface 66 of ferrule front section 65, and in particular at side 56 where the at least one optical path interface OPI is located.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A fiber optic interface device that supports at least one optical fiber, comprising:
    a housing having a front end, sides and an interior;
    a ferrule having a rear section supported in the housing interior and a front section having a surface and a front end, the front section extending from the housing front end, the ferrule being configured to support the at least one optical fiber to provide at least one optical path from the ferrule rear end to at least one optical path interface at the front section where the front end includes the at least one optical path interface; and
    a cover, the cover being positionable in open and closed positions and moveably secured to the housing, the cover supports a cleaning member, the cover configured to be placed in the closed position such that the cleaning member is proximate to the at least one optical path interface, and when in the open position the cleaning member is clear of the at least one optical path interface, wherein the positionable cover is pivotally engaged with the sides of the housing to allow the positionable cover to rotate between the closed and open positions.

2. The fiber optic interface device according to claim 1, further comprising the ferrule front section having a front end with at least one transverse dimension between about 2 mm and about 4 mm.

3. The fiber optic interface device according to claim 1, wherein the at least one optical path interface includes at least one lens.

4. The fiber optic interface device according to claim 1, further comprising the ferrule front section supporting the least one optical path interface on at least one of a ferrule front end, side, top and bottom.

5. The fiber optic interface device according to claim 1, wherein the cleaning member comprises a material selected from the group of materials comprising: cloth, a fibrous material, a coating, a abrasive, cleaning paper, polymer cleaning material, alcohol, and cotton.

6. The fiber optic interface of claim 1, wherein the fiber optic interface device constitutes a plug, and further comprising:
    an electronic device having an electronic device housing that defines an interior with a height HH;
    a circuit board operably supported within the electronic device interior, the circuit board having an upper surface that operably supports one or more circuit board components, with at least one of the one or more circuit board components having a greatest height HC as measured relative to the circuit board upper surface; and
    a receptacle operably supported by the circuit board and having an aperture with a height HE, the receptacle configured to matingly engage the plug, and wherein HC<HE<HH.

7. A fiber optic interface device having at least one optical path interface, comprising:
    a housing having a front end, sides and an interior;
    a ferrule supported by the housing and that has an outer surface and a front surface, at least one of which supports the at least one optical path interface; and
    a positionable cleaning cover having a cleaning member, the positional cleaning cover being pivotably engaged with the housing, the positionable cleaning cover being pivotable between a closed position that places the cleaning member in contact with or proximate to the at least one optical path interface and an open position that exposes the at least one optical path interface; wherein the positionable cover is pivotally engaged with the sides of the housing to allow the positionable cover to rotate between the closed and open positions.

8. The fiber optic interface of claim 7, wherein the ferrule front surface has a transverse dimension of between about 2 mm and about 4 mm.

9. The fiber optic interface of claim 7, wherein the at least one optical fiber interface is defined by at least one of an optical fiber end and a lens supported by the ferrule.

10. The fiber optic interface of claim 7, wherein the cleaning member comprises a material selected from the group of materials comprising: cloth, a fibrous material, a coating, a abrasive, cleaning paper, polymer cleaning material, alcohol, and cotton.

* * * * *